Figure 1:
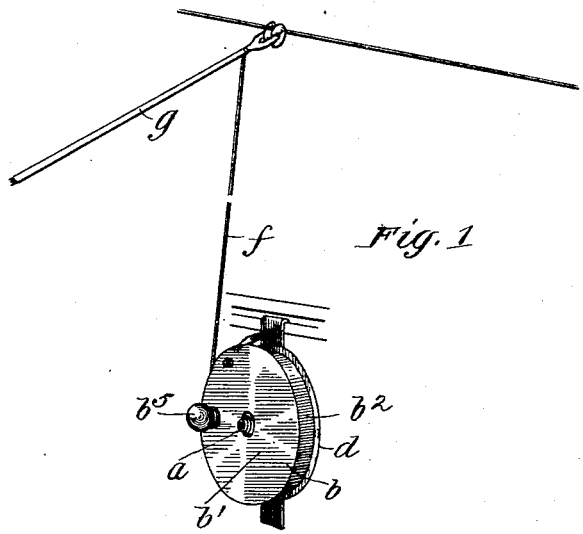

(No Model.) 2 Sheets—Sheet 1.

V. T. LYNCH.
TROLLEY POLE GOVERNOR.

No. 573,517. Patented Dec. 22, 1896.

Witnesses:
D. W. C. Tanner,
W. Clyde Jones.

Inventor:
Vernon T. Lynch,
By Barton Brown,
Attorneys.

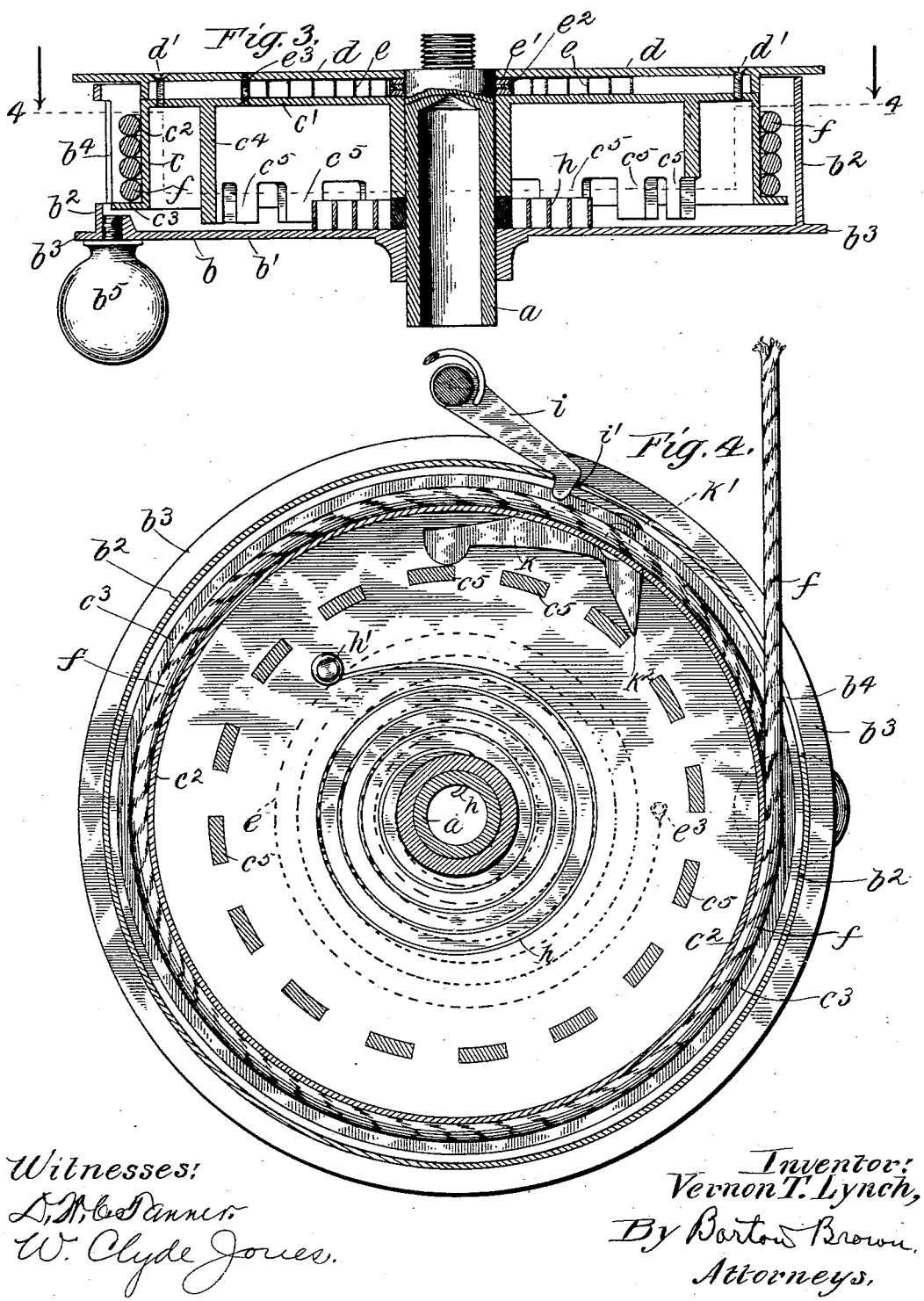

UNITED STATES PATENT OFFICE.

VERNON T. LYNCH, OF CHICAGO, ILLINOIS, ASSIGNOR OF ONE-HALF TO JOHN M. ROACH, OF SAME PLACE.

TROLLEY-POLE GOVERNOR.

SPECIFICATION forming part of Letters Patent No. 573,517, dated December 22, 1896.

Application filed March 4, 1896. Serial No. 581,798. (No model.)

*To all whom it may concern:*

Be it known that I, VERNON T. LYNCH, a citizen of the United States, residing at Chicago, in the county of Cook and State of Illinois, have invented a certain new and useful Improvement in Trolley - Pole Governors, (Case No. 1,) of which the following is a full, clear, concise, and exact description, reference being had to the accompanying drawings, forming a part of this specification.

My invention relates to a reel for the trolley-poles of electrical vehicles, its object being to provide means whereby a rope connected to the trolley-pole of an electric car may be maintained taut while permitting the rise and fall of the trolley-pole as the trolley-wheel travels along the conductor, and to further provide means for winding up the rope to draw down the trolley-pole the instant the trolley-wheel is thrown from the conductor or when it is desired to move the trolley-wheel out of contact with the trolley-conductor. I provide two rotary drums, one within the other, the rope connected with the trolley-pole passing through an opening in the periphery of the outer drum and being wound about the inner drum. A spring is provided which tends to rotate the inner drum and maintains the rope continuously taut, the spring being of less strength than the spring tending to elevate the trolley-pole, so that the inner drum maintains the rope taut while permitting the free movement of the trolley-pole. A catch normally maintains the outer drum against rotation, and a spring is provided tending to rotate the outer drum to wind the rope thereon and draw the trolley-arm downward and out of contact with the trolley. A locking device is provided which remains out of operation so long as the trolley-wheel bears against the trolley-conductor, and the movement of the inner drum is thus gradual, moving only sufficiently to take up and pay out the slack as the trolley-pole swings upon its pivot. Should, however, the trolley-wheel be thrown from the conductor, the trolley-pole is suddenly moved upward by the spring thereon, and the increased speed of movement of the inner drum throws the locking device into operation, at the same time releasing the catch in engagement with the outer drum. The spring tending to rotate the outer drum is of greater strength than the spring tending to elevate the trolley-pole, and in consequence the two drums are rotated together to wind the rope upon the outer drum and draw the trolley-pole downward. Should it be desired to move the trolley-wheel out of contact with the trolley-conductor at any time, the catch normally locking the outer drum may be released, and the drum will rotate to wind the rope thereon, and thus draw the trolley-arm downward and move the trolley-wheel out of engagement with the conductor.

I have illustrated my invention in the accompanying drawings, in which—

Figure 2:
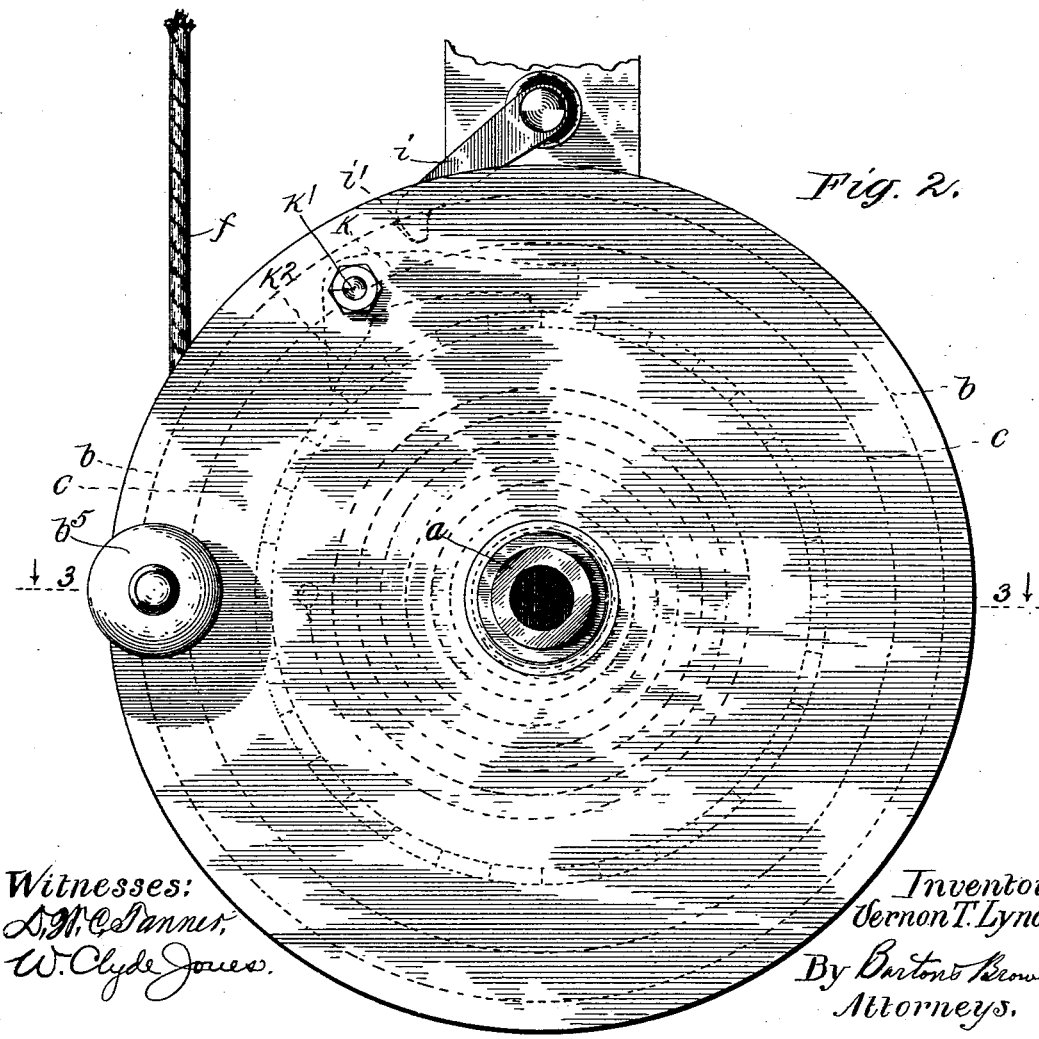

Figure 1 is a view in perspective of the reel of my invention, showing the manner of connecting the same with the trolley-arm. Fig. 2 is a view in elevation of the reel. Fig. 3 is a sectional view on line 3 3, Fig. 2. Fig. 4 is a sectional view on line 4 4, Fig. 3.

Like letters refer to like parts throughout the several figures.

A central stud or axle $a$ is provided which is maintained in a stationary position during the operation of the reel, and upon the stud $a$ are journaled the outer and inner drums $b$ and $c$. The outer drum $b$ comprises a disk $b'$, journaled upon the stud $a$ and carrying near the outer periphery a cylindrical portion $b^2$, which constitutes the face of the drum, about which the rope is adapted to be wound. A flange $b^3$ is provided for preventing the rope from leaving the drum. A handle $b^5$ is provided upon the outer drum for manually rotating the same. The inner drum $c$ also comprises a disk-like portion $c'$, journaled upon the stud $a$ and provided at the periphery with a cylindrical portion $c^2$, constituting the face of the drum, the cylindrical portion being provided with a flange $c^3$ to prevent the rope from leaving the drum. Against the face of the inner drum rests a plate $d$, being secured thereto by screws $d'$ $d'$, a space being left between the plate $d$ and the disk $c$, within which a helical spring $e$ is placed, one end of the said spring being attached to a collar or ring $e$, secured to the stud $a$ by means of a set-screw $e^2$, the opposite end of the spring being secured to a stud or pin $e^3$, carried upon the drum $c$.

The periphery of the plate $d$ extends beyond the face of the outer drum, and thus constitutes a flange which prevents the rope from passing from the drum.

An opening $b^4$ is provided in the outer drum, through which the rope $f$, secured to the trolley-arm $g$, is adapted to pass, the rope being wound about the inner drum and secured at the end thereto. The helical spring $e$ tends to rotate the inner drum in a direction to wind the rope thereon, and thus the rope is continuously maintained taut, the spring $e$ being of less strength than the spring pressing the trolley-arm upward, thus permitting the unwinding of the drum when the trolley-arm is elevated and winding up the slack when the trolley-arm is lowered.

A helical spring $h$ is provided, one end of which is secured to the stud $a$ while the other end is secured to a pin $h'$, carried upon the inner face of the outer drum. The spring $h$ thus tends to rotate the outer drum $b$ to wind the rope $f$ thereon, but the drum is normally maintained against rotation by the engagement of a catch or dog $i$ with a notch $i'$, provided in the periphery of the outer drum.

A cylindrical portion $c^4$ extends from the inner face of the drum $c$ and is provided at the edge with a series of teeth or projections $c^5 c^5$, against which the end of a pivoted lever $k$ is adapted to rest. The lever $k$ is pivoted at $k'$ and carries upon the opposite end a dog $k^2$, which, when the lever $k$ is rotated, is adapted to pass between the teeth $c^5 c^5$ and lock the outer and inner drums together. The end of the lever $k$ rests against the teeth, and so long as the inner drum moves back and forth slowly, as it does when giving out and taking up the slack in the rope, the dog $k^2$ remains out of engagement with the teeth $c^5$. Should, however, the trolley-wheel be thrown from the trolley-conductor, the rope $f$ will be rapidly unwound from the inner drum and a rapid rotation of the inner drum will result, which will cause the teeth $c^5$ to strike against the end of the lever $k$ with considerable force, thus rocking the lever upon its pivot and thrusting the dog $k^2$ between the teeth $c^5$, the lever $k$ at the same time striking the dog $i$ and moving the same out of engagement with the notch $i'$. The outer drum is thus released and at the same time the outer and inner drums are locked together.

The helical spring $h$ is stronger than the spring tending to elevate the trolley-arm, and in consequence the drums are rotated by means of said spring $h$ to wind the rope upon the outer drum and draw the trolley-arm downward.

The reel is preferably mounted upon the rear dashboard of the vehicle, and when it is desired to reverse the direction of travel of the vehicle the reel may be detached and placed upon the opposite end of the car.

It is evident that my invention is susceptible of modification and that other disposition of the drums may be made and other locking and releasing devices may be employed without departing from the spirit of my invention.

Having described my invention, what I claim as new, and desire to secure by Letters Patent, is—

1. In a controlling device for trolley-poles, the combination with a reel or drum upon which the rope or cord connected with the trolley-pole is adapted to be wound, of a spring for rotating the said drum to maintain the rope taut, a second reel or drum, a spring for rotating the said second drum to wind the rope thereon, and means controlled by the rapid rotation of the first-named reel or drum as the rope is unwound therefrom for throwing the said second-mentioned spring into action to wind the rope upon the second drum and draw the trolley-arm downward; substantially as described.

2. The combination with an upwardly-pressed trolley-pole, of a drum about which a rope attached to said trolley-pole is adapted to be wound, a spring for rotating said drum to maintain the rope taut, a second drum whereon the said rope is also adapted to be wound, a spring for rotating the same, a catch normally maintaining said second drum against rotation, a locking device for locking said drums together, and means controlled by the rapid rotation of said first-mentioned drum for actuating said locking device to lock the drums together and for releasing said catch to permit the drums to rotate to wind up the rope upon the second-mentioned drum and draw the trolley-pole downward; substantially as described.

3. The combination with the inner drum about which the rope secured to a trolley-pole is adapted to be wound, of the outer drum provided with an opening through which said rope passes to the inner drum, a spring for rotating the inner drum, said spring having a tension less than the tension of the spring tending to elevate the trolley-pole, a spring for rotating the outer drum and of a tension to overcome the tension of the spring tending to elevate the trolley-pole, a catch for normally maintaining the outer drum against rotation, a series of teeth provided upon the inner drum, and a lever pivoted to the outer drum and resting by the end against said teeth and arranged to thrust a dog between said teeth when rocked through a predetermined distance and at the same time to release said catch, whereby the rapid rotation of the inner drum causes said teeth to strike the pivoted lever to thrust the dog between the teeth carried upon the inner drum and to release the catch, substantially as and for the purpose set forth.

4. The combination with the stationary axle or stud $a$, of the outer drum $b$ journaled thereon and provided with an opening in the periphery for the passage of the rope attached to the trolley-pole, a drum $c$ situated within said outer drum and journaled upon said stud, helical spring $h$ secured at the ends respectively to said stud and said outer drum, a helical spring $e$ secured at the ends respectively to said stud and said inner drum, a rocking lever $k$ pivoted to the outer drum, a series of teeth $c^5 c^5$ carried upon the inner drum with which teeth the end of said rocking lever is adapted to engage, a dog $k^2$ carried upon the opposite end of said lever and arranged to pass between the said teeth when the lever is rocked to thus lock the two drums together, a catch $i$ for normally maintaining the outer drum against rotation, said catch being released by said rocking lever, substantially as described.

In witness whereof I hereunto subscribe my name this 2d day of March, A. D. 1896.

VERNON T. LYNCH.

Witnesses:
  GEORGE P. BARTON,
  JOHN W. SINCLAIR.